(12) United States Patent
Kikuchi et al.

(10) Patent No.: US 9,083,878 B2
(45) Date of Patent: Jul. 14, 2015

(54) FOCUS ADJUSTMENT UNIT AND CAMERA SYSTEM

(71) Applicant: Olympus Imaging Corp., Shibuya-ku, Tokyo (JP)

(72) Inventors: Tetsuo Kikuchi, Hachioji (JP); Yasutaka Sawa, Fuchu (JP)

(73) Assignee: Olympus Imaging Corp., Tokyo (JP)

( * ) Notice: Subject to any disclaimer, the term of this patent is extended or adjusted under 35 U.S.C. 154(b) by 159 days.

(21) Appl. No.: 13/850,885

(22) Filed: Mar. 26, 2013

(65) Prior Publication Data

US 2013/0258171 A1    Oct. 3, 2013

(30) Foreign Application Priority Data

Mar. 29, 2012    (JP) ................. 2012-077773

(51) Int. Cl.
  *G03B 13/00*    (2006.01)
  *H04N 5/232*    (2006.01)
  *G03B 13/36*    (2006.01)

(52) U.S. Cl.
  CPC .......... *H04N 5/23212* (2013.01); *G03B 13/36* (2013.01); *H04N 5/23209* (2013.01)

(58) Field of Classification Search
  None
  See application file for complete search history.

(56) References Cited

U.S. PATENT DOCUMENTS

| 6,094,223 A * | 7/2000 | Kobayashi ................ 348/354 |
| 8,531,587 B2 | 9/2013 | Kawarada |
| 2003/0063211 A1* | 4/2003 | Watanabe et al. ........... 348/345 |
| 2009/0167923 A1* | 7/2009 | Safaee-Rad et al. ......... 348/345 |
| 2011/0043678 A1* | 2/2011 | Ueda et al. ................ 348/345 |
| 2011/0164868 A1* | 7/2011 | Hamada ................... 396/123 |
| 2012/0182462 A1* | 7/2012 | Hamada ................... 348/352 |
| 2013/0033638 A1* | 2/2013 | Hamada ................... 348/345 |

FOREIGN PATENT DOCUMENTS

JP    2010-107711    5/2010

OTHER PUBLICATIONS

Notice of Rejection for Chinese Patent Application Serial No. 201310103545.0, mailed Jan. 7, 2015 (6 pgs.).

* cited by examiner

*Primary Examiner* — Sinh Tran
*Assistant Examiner* — Shahbaz Nazrul
(74) *Attorney, Agent, or Firm* — John C. Pokotylo; Straub & Pokotylo

(57)    ABSTRACT

A focus adjustment unit of the present invention comprises a lens drive section for driving the focusing lens, an image sensor for acquiring imaged data for a subject image, a control section for executing imaging operations using the image sensor by causing movement of the focusing lens, and carrying out scan operations for detecting position of the focusing lens at which a peak of image contrast occurs, a continuous shooting speed setting section for setting a speed for continuously executing exposure operations for shooting, and a limit time setting section for setting an effective limit time effective for carrying out the scan operation in accordance with a continuous shooting speed that has been set by the continuous shooting speed setting section, wherein the control section controls the scan operation so that the time that has been set up by the limit time setting section is not exceeded.

15 Claims, 12 Drawing Sheets

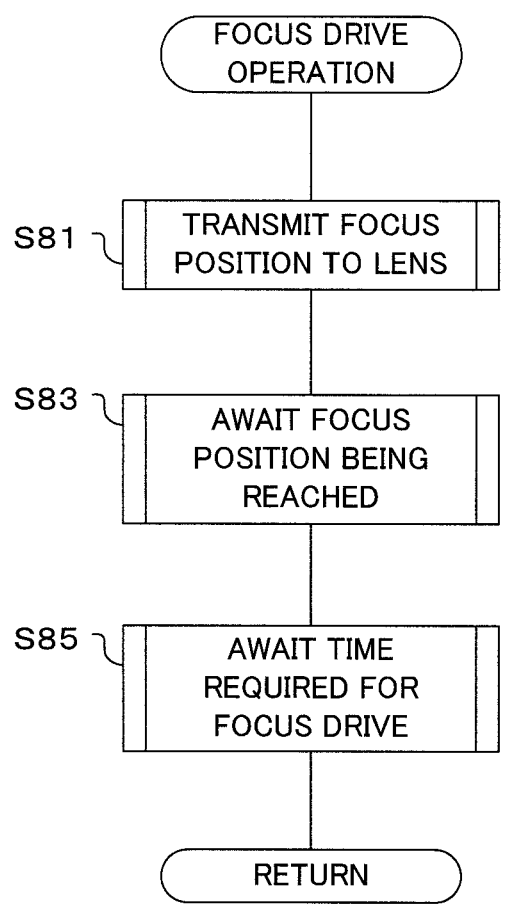

FIG. 8A

| ELEMENT NUMBER | FOCUS POSITION pos[ ] | FOCUS TIME time[ ] | |
|---|---|---|---|
| 0 | pos[0] | time[0] | LATEST FOCUS DATA |
| 1 | pos[1] | time[1] | FOCUS DATA ONE PREVIOUS |
| 2 | pos[2] | time[2] | FOCUS DATA TWO PREVIOUS |
| 3 | pos[3] | time[3] | FOCUS DATA THREE PREVIOUS |

FIG. 8B

| SYNCHRO-NIZATION FREQUENCY | IS THERE CANCEL OF HYSTERESIS? | TIME REQUIRED FOR FOCUS DRIVE |
|---|---|---|
| 120Hz | 0 (NOT REQUIRED) | 10ms |
| 60Hz | | 30ms |
| 120Hz | 1 (REQUIRED) | 50ms |
| 60Hz | | 80ms |

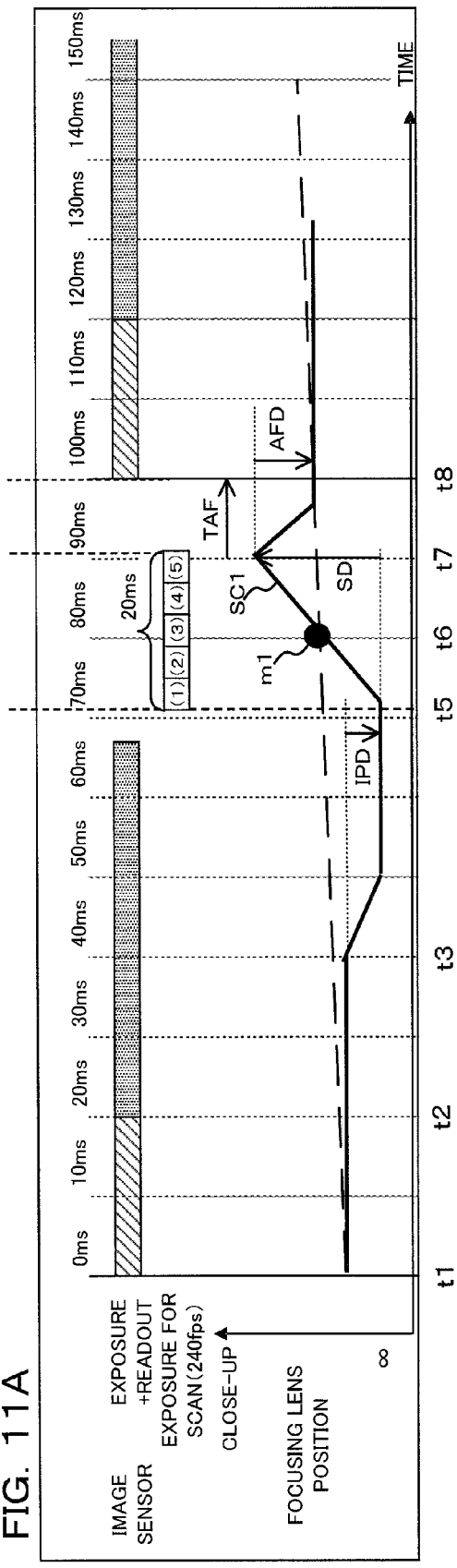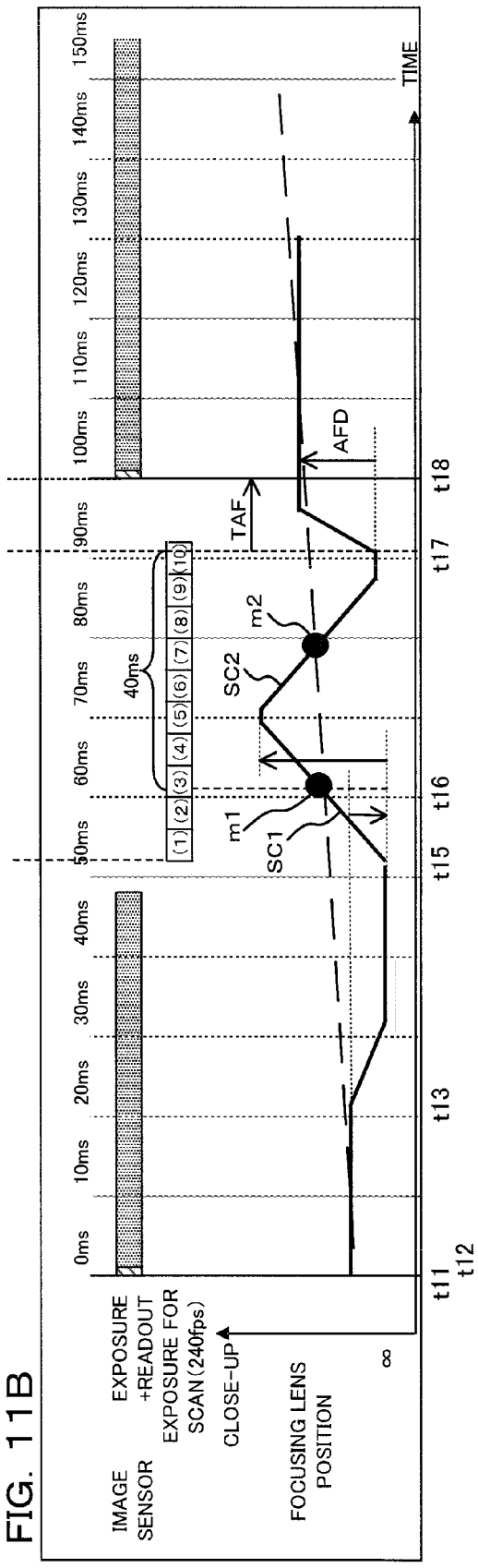

FOCUS ADJUSTMENT UNIT AND CAMERA SYSTEM

Benefit is claimed, under 35 U.S.C. §119, to the filing date of prior Japanese Patent Application No. 2012-077773 filed on Mar. 29, 2012. This application is expressly incorporated herein by reference. The scope of the present invention is not limited to any requirements of the specific embodiments described in the application.

BACKGROUND OF THE INVENTION

1. Field of the Invention

The present invention relates to a focus adjustment unit and camera system, and in detail relates to a focus adjustment unit and camera system for carrying out focusing by moving a focusing lens to a position at which contrast of an image becomes a peak, based on imaged data acquired from an image sensor.

2. Description of the Related Art

In the case of a subject in motion, even if there is focus, the subject moves within a time lag of the shutter after the shutter release button has been operated, and there may be cases of out of focus photographs. A focus adjustment unit is known that has so-called dynamic prediction AF, for predicting focus position at the time of exposure, based on ranging results carried out a plurality of times until the shutter release button is operated. When carrying out dynamic prediction AF, generally, in the case of focus adjustment using a phase contrast method, focus position is predicted based on a history of a plurality of defocus amounts that have been detected, and in the case of focus adjustment using a contrast method focus position is predicted based on a history of a plurality of focus positions that have been detected (refer, for example, to Japanese patent laid-open No. 2010-107711 (laid-open May 13, 2010)). There is also known as focus adjustment unit that carries out so-called C-AF (continuous AF) for carrying out focusing continuously while the shutter release button is being pressed down halfway.

SUMMARY OF THE INVENTION

An object of the present invention is to provide a focus adjustment unit and camera system capable of carrying out contrast detection an optimum number of times in accordance with a set continuous shooting speed, when performing a continuous C-AF operation in contrast AF.

A focus adjustment unit of the present invention, for carrying out focus adjustment of a photographing optical systems that concentrates light from a subject, including a focusing lens capable of movement in the optical axis direction, comprises a lens drive section for driving the focusing lens, an image sensor for acquiring imaged data for a subject image that has been concentrated by the photographing optical system, a control section for executing imaging operations using the image sensor by causing movement of the focusing lens, and carrying out scan operations for detecting position of the focusing lens at which a peak of image contrast occurs, based on a plurality of items of imaged data output by the image sensor, a continuous shooting speed setting section for setting a speed for continuously executing exposure operations for shooting using the image sensor, and a limit time setting section for setting an effective limit time for carrying out the scan operation in accordance with a continuous shooting speed that has been set by the continuous shooting speed setting section, wherein the control section controls the scan operation so that the time that has been set by the limit time setting section is not exceeded.

A camera system of the present invention, comprising a camera body having an image sensor, and an interchangeable lens removably attached to the camera body, wherein the interchangeable lens comprises a photographing optical system, including a focusing lens capable of moving in the optical axis direction and capable of adjusting a focused state, for introducing subject light to the image sensor, a lens communication section for carrying out communication with the camera body, and a lens control section for controlling communication operations with the camera body by the lens communication section, and controlling movement of the focusing lens, and the camera body comprises a body communication section for carrying out communication with the interchangeable lens, a body control section for instructing movement of the focusing lens to the lens control section, and carrying out focus adjustment by executing imaging operations using the image sensor and controlling scan operations for detecting position of the focusing lens at which a peak of image contrast occurs, based on a plurality of items of imaged data output by the image sensor, a continuous shooting speed setting section for setting a speed for continuously executing exposure operations for shooting using the image sensor, and a limit time setting section for setting an effective limit time for carrying out the scan operation in accordance with a continuous shooting speed that has been set by the continuous shooting speed setting section, wherein the body control section controls the scan operation so that the limit time that has been set up by the limit time setting section is not exceeded.

A focus adjustment unit of the present invention, for carrying out focus adjustment of a photographing optical system that concentrates light from a subject, including a focusing lens capable of movement in the optical axis direction, comprises a lens drive section for driving the focusing lens, an image sensor for acquiring imaged data for a subject image that has been concentrated by the photographing optical system, and a control section for executing imaging operations using the image sensor by causing movement of the focusing lens, and carrying out a scan operation for detecting position of the focusing lens at which a peak of image contrast occurs, based on a plurality of items of imaged data output by the image sensor, wherein the control section stores a minimum value for a number of frames of imaged data required in order to detect a peak of contrast using the scan operation, and carries out scan operation in accordance with a number of frames being the minimum value or more.

BRIEF DESCRIPTION OF THE DRAWINGS

FIG. 7 is a flowchart showing a focus drive implementation operation of the camera of the one embodiment of the present invention.

FIG. 8A shows one example of a focus history stored in a storage section of the camera of one embodiment of the present invention, and FIG. 8B shows one example of required focus times corresponding to number of image sensor frames.

FIG. 11A is a timing chart showing camera operation for the case of an exposure time of $1/50^{th}$ of a second, while FIG. 11B is a timing chart showing camera operation for the case of an exposure time shorter than $1/50^{th}$ of a second, for the camera of the one embodiment of the present invention.

DETAILED DESCRIPTION OF THE PREFERRED EMBODIMENTS

Preferred embodiments using a camera to which the present invention has been applied will be described in the following in accordance with the drawings. The camera of a preferred one embodiment of the present invention is a digital camera. This camera carries out focus adjustment of an imaging optical system that concentrates light from a subject, including a focusing lens that can be moved in the optical axis direction by a lens drive section.

The camera of this embodiment has an imaging section, with a subject image being converted to image data by this imaging section, and the subject image being subjected to live view display on a display section arranged on the rear surface of the camera body based on this converted image data. A photographer determines composition and photo opportunity by looking at the live view display.

Also, if continuous AF is set, the camera of this embodiment causes a scan operation of the photographing lens, acquires a contrast value based on image data from the imaging section at this time taking this contrast value as a peak, and stores a history of times when a focus position is reached and the focus positions of the focusing lens. At the time of release operation, and at the time of subsequent continuous shooting, the camera predicts focus position at the time of exposure taking into consideration time lag, based on the focus history. At this time, the control section for the scan operation sets a limit time for which carrying out the scan operation is effective, and controls the scan operation so that this limit time (also called cut-off time) is not exceeded.

Also, the control section for the scan operation controls the scan operation in accordance with the minimum number of frames of imaged data required in order to a detect contrast peak. If image data is acquired by exposure, this image data is subjected to image processing and stored in a storage medium. Image data that has been stored in the storage medium can be played back and displayed on the display section if playback mode is selected.

Figure 1:
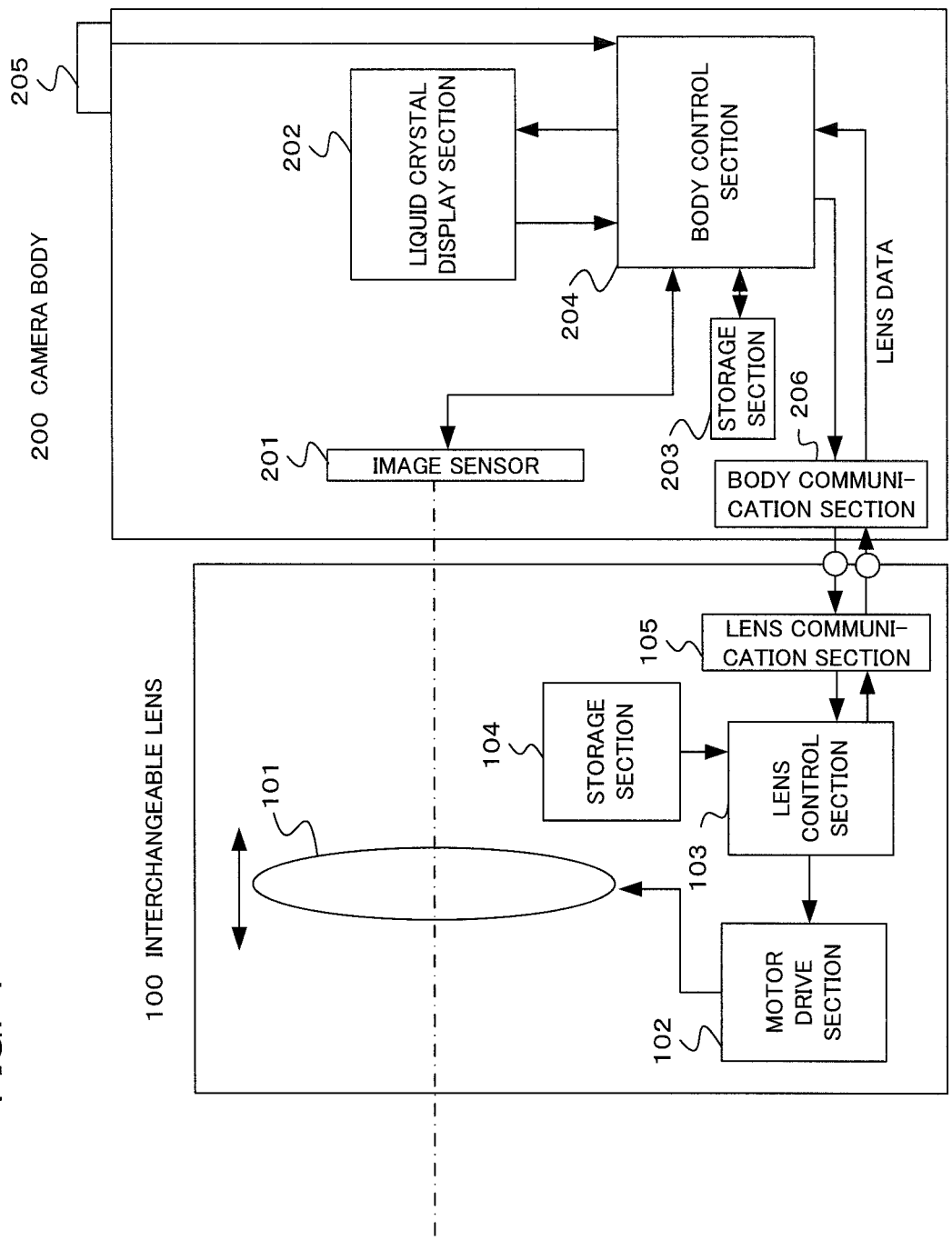
FIG. 1 is a block diagram mainly showing the electrical structure of a camera of one embodiment of the present invention.

FIG. 1 is a block diagram mainly showing the electrical structure of a camera of one embodiment of the present invention. The camera of this embodiment comprises a camera body 200 having an image sensor, and an interchangeable lens 100 that is removably attached to this camera body 200.

With this embodiment, an interchangeable lens is exemplified, but it is also possible to fix a lens barrel having a photographing lens to the camera body.

A photographing lens 101, motor drive section 102, lens control section 103, storage section 104 and a lens communication section 105 are provided within the interchangeable lens 100. The photographing lens 101 includes an optical lens such as focusing lens for adjusting focused state capable of moving in an optical axis direction, or a zoom lens capable of adjusting focal length. A subject image is formed by an imaging optical system constituted by these optical lenses. The motor drive section 102 has a drive source such as a motor, and causes the focusing lens to move along the optical axis of the imaging optical system. With this embodiment, the motor drive section 102 functions as a lens drive section for driving the focusing lens.

The lens control section 103 is constituted by a lens CPU and its peripheral circuits. The lens CPU carries out control of the interchangeable lens 100 in accordance with programs stored in the storage section 104 and control instructions from a body CPU within the body control section 204 at the camera body 200 side. As control, for example, in accordance with instructions from the body control section 204, movement of the focusing lens of the photographing lens 101 is controlled via the motor drive section 102, and a scan operation of the focusing lens and drive to a focus position etc. are carried out. Also, lens state, such as current position of the focusing lens or zoom lens, scan operation in progress etc., and information inherent to the lens etc. is transmitted as lens data to the camera body 200 side by means of the lens communication section 105.

The storage section 104, as well as storing the above-described programs, also stores inherent information such as optical information of the interchangeable lens 100, and factory default adjustment values etc. As inherent information of the interchangeable lens 100 it is possible to store, for example, required focus time according to frame rate of the image sensor 201. The storage section 104 has a function as a lens data storage section for storing lens data which is information relating to the interchangeable lens 100 read out by the lens control section 103.

The lens communication section 105 carries out communication with the camera body 200. Specifically, if the interchangeable lens 100 is attached to the camera body 200, connection is made with the body communication section 206 of the camera body 200 and communication between the lens control section 103 and the body control section 204 becomes possible.

The image sensor 201, liquid crystal display section 202, storage section 203, body control section 204, operating section 205 and body communication section 206 are provided within the camera body 200. The image sensor 201 is arranged on the optical axis of the photographing lens 101 close to an imaging position of a subject image, and outputs image data (also called imaged data) obtained by photo-optically converting a subject image using a plurality of pixels arranged in a two dimensional array to the body control section 204. Specifically, the image sensor 201 acquires imaged data for a subject image that has been formed by the photographing optical system.

The body control section 204 is constituted by a body CPU and its peripheral circuits. The body CPU carries out overall control of the camera in accordance with programs stored in the storage section 203. As peripheral circuits within the body control section 204, various circuits are provided, such as an image processing circuit, contrast AF circuit, compression and expansion circuit and communication circuit etc. The contrast AF circuit is input with image data from the image sensor 201, and acquires a contrast value for a subject images by, for example, acquiring a differential signal between adjacent pixels.

Also, the body control section 204 outputs various control instructions for the lens control section 103, such as a scan operation instruction, focus position movement instruction, lens data request instruction etc. to the lens control section 103, by means of the body communication section 206 and the lens communication section 105. If the body control section 204 outputs a lens data request instruction, lens data such as optical information and state of the interchangeable lens 100 is input from the lens control section 103.

Also, with this embodiment, the body control section 204 functions as a control section for executing an imaging operation using the image sensor 201 by causing movement of the focusing lens within the photographing lens 101, and carrying out a scan operation to detect a position of the focusing lens where contrast of an image becomes a peak based on a plurality of items of imaged data output by the image sensor 201.

Also, with this embodiment, the body control section 204 also functions as a continuous shooting speed setting section for setting a speed for continuously executing an exposure operation for photographing using the image sensor 201. Specifically, it is possible to set a number of shot frames per unit time at the time of continuous shooting using the operating section 205, which will be described later, and a continuous shooting speed setting section sets a continuous shooting speed for the time of an exposure operation in accordance with the number of shot frames that has been set. For example, with continuous shooting of 10 frames per second, continuous shooting speed is set to $1/10$, and an exposure is repeated once every 100 ms.

Also, with this embodiment, the body control section 204 also functions as a limit time setting section for setting an effective limit time for carrying out a scan operation in accordance with continuous shooting speed that has been set by the continuous shooting speed setting section. If continuous shooting speed has been determined, a start time (exposure start time) for exposure is determined, and a time before it is necessary to cause the focusing lens to move to a predicted focus position by the time this exposure commences becomes the limit time. In other words, the limit time setting section sets the limit time to a time that is before the time when exposure for shooting by the image sensor commences, by a movement time for achieving focus by moving the focusing lens to a focusing lens position where contrast detected by the scan operation becomes a peak. With this embodiment, the limit time is also referred to as a scan cut-off time.

Also, the body control section 204 sets the movement time in accordance with lens data that has been stored in the lens data storage section (storage section 104) that has been acquired via the body communication section 206. The body control section 204 controls a scan operation so that the time set by the limit time setting section is not exceeded (refer to S35, S45 of FIG. 4 which will be described later).

Also, the body control section 204 stores a minimum value for a number of frames of imaged data required in order to detect a peak of contrast using the scan operation, and carries out scan operation in accordance with a number of frames being the minimum value or more (refer to S37, S47 of FIG. 4, which will be described later).

The storage section 203 within the camera body 200 has various memory such as volatile rewritable memory such as RAM, non-volatile rewritable memory such as flash memory, and removable storage media etc. Besides programs for the body CPU, which were described previously, various data for adjustment are stored in the nonvolatile memory. Image data for taken images that have been subjected to image processing by the body control section 204 are stored in the storage medium. Also the storage section 203 stores a time for executing a scan operation to detect a focusing lens position at which contrast of an image becomes a peak. The function of storing focus history may also be fulfilled by a temporary storage section incorporated into the body control section 204.

The liquid crystal display section 202 has a liquid crystal monitor arranged on the rear surface etc. of the camera body 200. Live view display based on image data from the image sensor 201, playback display based on taken image data that has been read out from the storage section 203, and display of menu images etc. for setting various shooting modes, are carried out on the liquid crystal display section 202. The monitor is not limited to a liquid crystal monitor, and another monitor such as organic EL may also be used, and may be arranged on other than the rear surface of the camera body 200.

The operating section 205 is provided with various operating members such as a release button, power supply button, menu button, OK button, and a cross key button, and operating states of these operating members are output to the body control section 204. The body control section 204 executes camera control in accordance with operation signals from the operating section 205. Various settings, such as various mode settings like continuous shooting mode and continuous AF mode, setting of continuous shooting speed (number of shot frames at the time of continuous shooting) when continuous shooting mode is set, release priority mode etc. are carried out on menu screens etc. In the case where the above-described release priority mode is on, priority is given to continuous shooting using the continuous shooting speed even if focus has not been achieved, while if the release priority mode is off, shooting is not executed if a focused state has not been achieved.

The body communication section 206 performs communication with the interchangeable lens 100. Specifically, if the interchangeable lens 100 is attached to the camera body 200, the body communication section 206 establishes connection with the lens communication section 105 within the interchangeable lens 100 and communication between the lens control section 103 and the body control section 204 becomes possible.

Next, operation of this embodiment will be described using the flowcharts shown in FIG. 2 to FIG. 7. These flowcharts are executed by the body control section 204 in accordance with programs that have been stored in the storage section 203. A focus adjustment operation of this embodiment will be described using operation for the case where continuous AF (also called C-AF) and release priority have being set on menu screens.

Continuous AF of this embodiment is an AF mode where AF operation is carried out repeatedly, and is adopted in single frame shooting and continuous shooting. With single frame shooting, if the release button within the operating section 205 is pressed down, an exposure is carried out one time, and image data is stored in the storage section 203. With continuous shooting, exposure is carried out repeatedly at specified time intervals while the release button is being pressed down, and image data that has been acquired in the exposures is sequentially stored in the storage section 203. Single frame shooting and continuous shooting are set on menu screens etc. Also, a case where continuous shooting mode has been set and C-AF mode has been set is continuous shooting C-AF.

Figure 2:
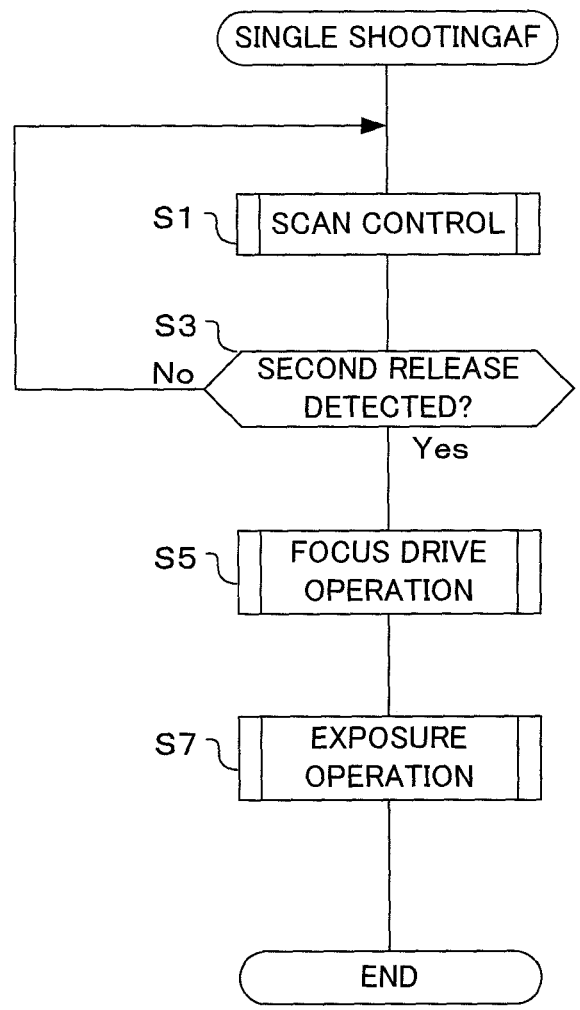
FIG. 2 is a flowchart showing basic operation (single AF) of the camera of one embodiment of the present invention.

If single frame mode has been set and release button is pressed down half way, the processing flow for single shooting AF shown in FIG. 2 is commenced. If the single shooting AF processing flow is entered, scan control is first executed (S1). Here, the lens control section 103 within the interchangeable lens 100, causes drive of the focusing lens towards the close up end or the infinity end by the motor drive section 102 to commence, and a contrast AF circuit within the body control section 204 calculates a contrast value based on image data from the image sensor 201 (imaged data) during movement of the focusing lens. A focus position of the focusing lens when this contrast value becomes a peak is calculated, and a focus history comprising sets of focus position and focus time is stored in the storage section 203. Detailed operation of this scan control will be described later using FIG. 4.

If scan control has been carried out, it is next determined whether or not second release has been detected (S3). If the release button within the operating section 205 transitions from being pressed down half way to being pressed down fully, a second release switch is turned on, and so in this step determination is based on the state of the second release switch. If the result of this determination is that a second release has not been detected, namely that the release button has not been pressed down fully, processing returns to step S1 and scan control continues.

If the result of determination in step S3 is that second release has been detected, focus drive is executed (S5). Here, focus position during exposure (point in time where ½ of the time from commencement of exposure to completion of exposure has elapsed) is predicted taking into consideration a time lag until exposure using a focus history that has been stored during the scan control of step S1, and the focusing lens is moved to the predicted focus position by the lens control section 103 and the motor drive section 102. In the case where reliability of the predicted position is low, the focusing lens is moved to a final focus position.

If the focus drive of step S5 has been executed, exposure is next carried out (S7). Here, exposure control is carried out at an aperture value and shutter speed etc. for achieving optimal exposure, image processing is carried out on image data that has been acquired by the image sensor 201 at this time, and image data that has been subjected to this image processing is stored in the storage section 203. Once exposure is completed, the processing flow for this single AF is terminated.

Figure 3:
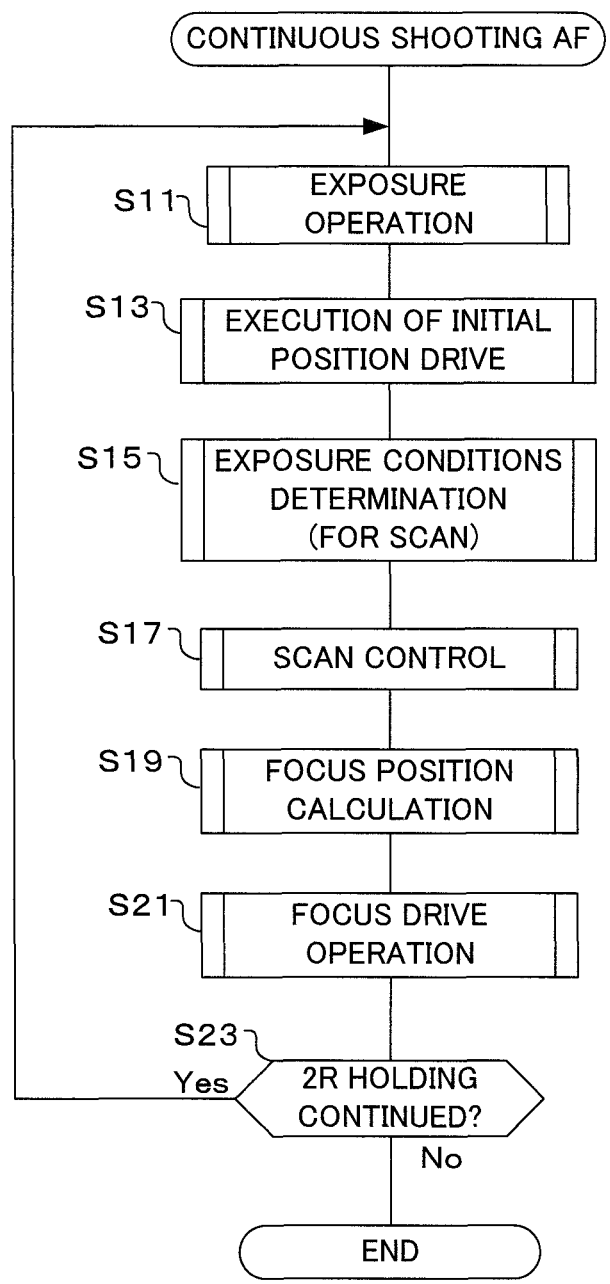
FIG. 3 is a flowchart showing basic operation (continuous AF) of the camera of one embodiment of the present invention.

Next, continuous shooting AF will be described using the flowchart shown n FIG. 3. If the release button is pressed down fully when continuous shooting mode is set, the processing flow for continuous shooting AF shown in FIG. 3 is commenced. If the continuous shooting processing flow is entered, first exposure is carried out (S11). Here, image processing is applied to image data that has been acquired similarly to step S7 of FIG. 2, and this image data is stored in the storage section 203.

If the exposure of step S11 has been carried out, then next initial position drive is carried out (S13). Scan control of step S17, which will be described later, is carried out, but at the time of commencing the scan control the focusing lens is driven to an optimum position. Specifically, with contrast AF, a peak of contrast value is detected, and at the time of the exposure in step S11 the focusing lens is moved to a peak of the contrast value. Scan for contrast AF preferably starts at a position slightly offset from a peak position. In this step, therefore, drive is performed so that a position that is slightly offset from the peak position of contrast value becomes the initial position, taking into consideration the drive direction of the focusing lens up to that time.

If initial position drive has been carried out in step S13, exposure conditions for scan are next determined (S15). Here, exposure conditions at the time of scan control carried out in step S17 are determined. In determining exposure conditions, image data for when exposure was carried out the previous time, or image data for a live view image, is acquired, brightness information is calculated from this image data, and exposure conditions during scan (for example electronic shutter speed etc.) are determined.

If determination of exposure conditions has been carried out in step S15, scan control is next carried out (S17). Here, similarly to step S1 of FIG. 2, acquisition of contrast value is carried out while moving the focusing lens. Detailed operation of this scan control will be described later using FIG. 4. With continuous shooting AF, exposure and scan control are repeated while the release button is pressed down fully. Scan drive is carried out for a specified number of frames in accordance with the continuous shooting speed when continuous shooting is set (that is, carried out for a number of frames within a range that does not exceed an upper limit).

If the scan control has been carried out in step S17, calculation of focus position is next carried out (S19). Here, similarly to step S5 in FIG. 2, focus position during exposure is predictively calculated taking into consideration a continuous shooting interval until the exposure of step S11, using a focus history that was stored during the scan control of step S17.

If calculation of focus position has been carried out in step S19, focus drive is next carried out (S21). Here, the focusing lens is moved by the lens control section 103 and the motor drive section 102 to a focus position that has been calculated in step S19. Detailed operation of this focus drive operation will be described later using FIG. 7.

If focus drive has been carried out in step S21, it is next determined whether or not 2R is kept held (S23). As described previously, in continuous shooting mode continuous shooting continues while the release button is pressed down fully. In this step, it is determined whether or not the second release (2R) switch, that is linked to full pressing down of the release button, remains on.

If the result of determination in step S23 is that 2R is maintained, processing returns to step S11, where exposure is carried out and continuous shooting continues. On the other hand, if maintaining of 2R does not continue, namely if the user's finger has been taken off the release button, the processing flow for continuous shooting AF is terminated.

Next, detailed operation of the scan control in step S1 (refer to FIG. 2) and step S17 (refer to FIG. 3) will be described using the flowchart shown in FIG. 4. If the processing flow for scan control is entered, first, scan drive is commenced (S31). Here, the body control section 204 instructs the lens control section 103 to commence scanning (scan) of the focusing lens using the motor drive section 102. Also, once scan has commenced, the contrast AF circuit within the body control section 204 calculates a contrast value based on an image signal from the image sensor 201.

If scan drive has commenced, direction determination is carried out next (S33). If scan drive has commenced, a contrast value is calculated by the contrast AF circuit each time a single frame of image data is output, as described previously, and so it is determined whether this contrast value has increased or decreased for each frame. Direction determination is decided if the contrast value increases or decreases for a specified number of frames.

If direction determination has been carried out, it is next determined if a scan cut-off time has been reached, or if a direction has been decided (S35). Here, the scan cut-off time is calculated using equation (1) below.

$$\text{scan cut-off time} = \text{predicted time of commencement of next exposure} - \text{time required for focus drive} \quad (1)$$

Using the scan cut-off time calculated with this equation (1), if the current time≥scan cut-off time it is determined that the cut-off time has been reached, while if the current time<scan cut-off time it is determined that the cut-off time has not been reached.

In step S35, in addition to the previously described determination of whether cutoff time has been reached, it is also determined whether or not direction has been decided. As described previously, direction determination is carried out in step S33, and it is determined whether or not the contrast value has increased or decreased.

If the result of determination in step S35 is that the cut-off time has been reached, or that direction has been decided, it is next determined whether a minimum number of frames has been reached, or whether or not direction has been decided (S37). Here, in order to give a reliable focus position using contrast AF, it is determined whether or not contrast detection has been carried out for a minimum number of frames, for example, with this embodiment, for image data of 7 frames. The minimum number of frames can be further increased, for example, by 2 frames, in the case where focal length is long, or in the case of a lens having a large wide open aperture (small F No.). This is a minimum frame number is either stored in the storage section 203 in accordance with conditions, or acquired as lens information from the interchangeable lens 100.

Accordingly, with this embodiment, in the case where number of frames used in the scan≥7 frames (+2 frames), it is determined that the minimum number of frames has been reached, while when the number of frames used in the scan<7 frames (+2 frames) it is determined that the minimum number of frames has not been reached. In this step also, similarly to step S35, it is determined whether or not direction has been decided.

If the result of determination in step S35 and step S37 is that the cut-off time has not been reached, and that direction has not been decided, or that the minimum frame number has not been reached and direction has not been decided, processing returns to step S33 and direction determination is performed. On the other hand, if the result of determination in step S35 and S37 is that the cut-off time has been reached and the minimum frame number has been reached, or that direction has been decided, determination is next carried out on the direction determination result (S39). The effect of determination using the above described cut-off time and the minimum number of frames being reached will be described later using FIG. 11A and FIG. 11B.

In step S39 determination is based on the results of direction determination that was carried out in step S33. In the case where contrast value was increased, it means there will be a peak in the direction of movement of the focusing lens, and so this is determined as a forward direction. In the case where contrast value was decreased, it means there will be a peak in the direction opposite to the direction of movement of the focusing lens, and so this is determined as a reverse direction. Also, if the cut-off time was reached and the minimum number of frames was reached in steps S35 and S37, then the direction determination result for step S39 is determined to be unknown. In cases such as where the subject is moving at high-speed or has low contrast, the direction determination becomes unknown.

If the result of determination in step S39 was a reverse direction, the scan direction is next reversed (S41). Here, the body control section 204 instructs the lens control section 103 to reverse the scan direction of the focusing lens using the motor drive section 102.

If the scan direction has been reversed in step S41, or if the result of determination in step S39 was a forward direction, the peak detection is carried out next (S43). As was described previously, during the scan drive the contrast AF circuit calculates a contrast value every time image data for a single frame is output. In this step, a change from an increase to a decrease of the contrast value, that arises when the contrast value has reached a peak, is detected If peak detection has been carried out in step S43, it is next determined if the cut-off time has been reached, or if it was possible to detect a peak (S45). Here, similarly to step S35, it is determined whether or not the cut-off time has been reached. It is also determined whether or not it was possible to detect a peak in step S43.

If the result of determination in step S45 is that the cut-off time has been reached, or that the peak was detected, it is next determined whether the minimum number of frames has been reached, or whether or not it was possible to detect a peak (S47). Here, similarly to step S37, it is determined whether or not the minimum number of frames has been reached. It is also determined whether or not it was possible to detect a peak in step S43.

If the result of determination in step S45 is that a peak was not detected and the cut-off time was not reached, or if the result of determination in step S47 was that a peak was not detected and the minimum number of frames was not reached, processing returns to step S43, and peak detection is performed. On the other hand, if the result of determination in step S45 and S47 is that the cut-off time has been reached and the minimum number of frames has been reached, or that it was possible to detect a peak, determination is next carried out for peak detection decision results (S49).

In step S49, determination is based on the peak detection decision results of step S43. In the case where peak detection was not possible, and when the cut-off time has been reached and the minimum number of frames has been reached, it is determined that detection is not possible. In cases such as where the subject is moving at high-speed or has low contrast, the peak detection becomes impossible.

If the result of determination in step S49 was that peak detection was achieved, a focus position is next calculated, and a focus history is saved (S51). Here, a focus position (focusing lens position) for a peak of AF evaluation value is calculated using a quadratic curve approximate expression, from AF evaluation values (contrast values) of 3 points close to a peak, and positions of the focusing lens at that time. This focus position and focus time are saved as a set in the storage section 203, as focus history.

One example of stored focus history is shown in FIG. 8A. In this example, focus position pos[0] and focus time time[0] are stored as latest focus data, focus position pos[1] and focus time [1] are stored as focus data one previous . . . .

If focus position has been calculated and focus history saved in step S51, it is next determined whether or not the cut-off time has been reached (S53). Here, it is determined whether or not the cut-off time described for step S35 has been reached.

If the result of determination in step S53 is that the cut-off time has been reached, it is next determined whether or not a minimum number of frames has been reached (S55). Here, it is determined whether or not the minimum number of frames described for step S37 has been reached.

If the result of determination in step S53 is that the cut-off time has not been reached or that the minimum number of frames has not been reached, the scan direction is reversed (S57). Since the result of determination in step S49 makes it apparent that a peak of contrast value has been passed, the drive direction of the focusing lens is reversed in order to detect the peak once more. Therefore, the body control section 204 instructs the lens control section 103 to reverse the scan direction of the focusing lens using the motor drive section 102.

If the scan direction has been reversed in step S57, processing returns to step S33, a peak of contrast value is obtained in steps S33-S49, and focus position is calculated. On the other hand, if the result of determination in steps S53 and S55 is that the cut-off time has been reached and the minimum number of frames has been reached, or if the result of determination in step S39 is that the direction determination decision result is unknown, or if the result of determination in step S49 is that the peak detection decision result is detection impossible, the flow for the scan control is terminated and the originating processing flow is returned to.

Figure 4:
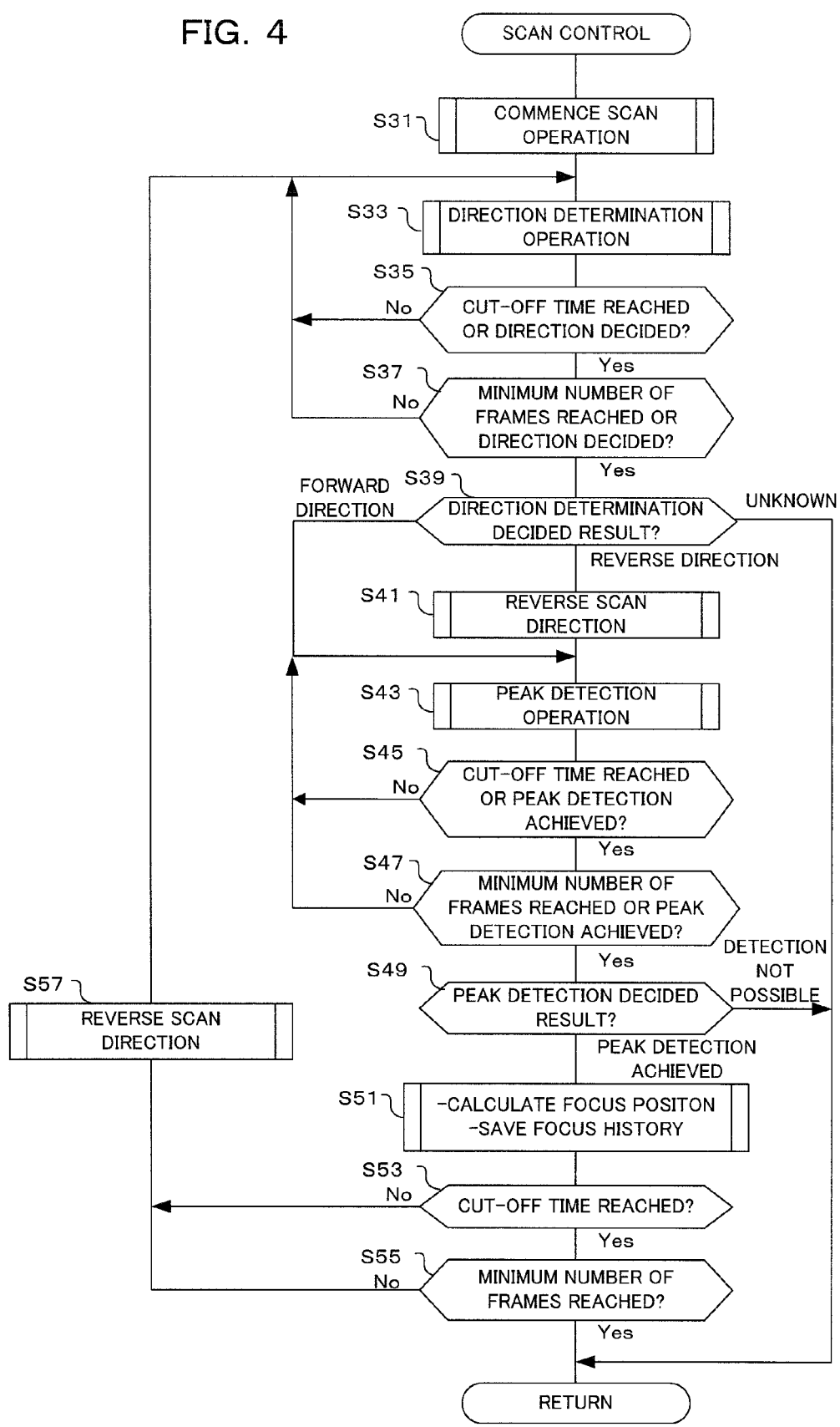
FIG. 4 is a flowchart showing operation for scan control of the camera of the one embodiment of the present invention.

In the processing flow shown in FIG. 4, determination such as the determination of cut-off time being reached and the determination of the minimum number of frames being reached of steps S35, S37, S45 and S47, and the determination of the peak detection decision result of step S49, are only executed if release priority is on. In the event that release priority is off, scan is repeated until focus detection becomes possible, and so scanning continues until peak detection, and it does not matter if the cut-off time is reached or if the minimum number of frames is reached. However, the determination as to whether the cut-off time has been reached and the determination as to whether the minimum number of frames has been reached after focus detection in steps S53 and S55 is carried out regardless of whether release priority is set to on or off. As a result, with this embodiment, release priority mode is settable, but the body control section 204 permits execution of a scan operation after a time that has been set by the limit time setting section (in this embodiment a function of the body control section 204) in the case where release priority mode is not set.

In this way, in the flow for scan control, in the case where continuous shooting C-AF is carried out in the contrast AF, a maximum time for which scan is possible (scan termination cut-off time) is set in accordance with continuous shooting speed setting, and scan is carried out within a range of this time (refer to steps S35, S45). Also, the scan termination cut-off time during continuous shooting is calculated using (desired time to commence of next exposure)−(time taken for focus drive etc.) (calculated during the determination of steps S35 and S45). Also, if continuous shooting speed has been decided, the time to start exposure is decided.

Also, as a scan termination condition, a minimum number of frames required in order to find a peak in the scan is decided, and a number of frames that is this minimum number of frames or greater should be reached (refer to S37, S47). Specifically, with this embodiment, the body control section 204 stores a minimum value for a number of frames of imaged data required in order to detect a peak of contrast using the scan operation, and carries out scan operation in accordance with a number of frames being this minimum value or more. In simply deciding the scan termination cut-off time, in the event that the exposure time is too long there may be situations where the time in which scan is possible becomes zero, and so normally the minimum number of frames that enables focusing is ensured.

With this embodiment, the body control section 204 determines that detection is impossible in the case where detection of a peak of contrast was not possible when the number of frames the scan operation was carried out for has reached the minimum number (S47Y→S49 detection impossible). This case arises when the subject is moving etc., and detection of a peak of contrast is not possible even if the scan operation is repeated, and so detection is terminated.

Also, with this embodiment the body control section 204 continues the scan operation until the number of frames reaches the minimum value, in the case where it was not possible to detect a peak of contrast at the time that the limit time was reached during the scan operation (S45Y→S47N). As a result, in predicting the focus position, since peak detection is carried out by carrying out a scan operation for a minimum number of frames, it becomes possible to ensure focus precision and prediction accuracy.

Also, with this embodiment, the minimum number of frames is further increased by a specified number of frames, for example, by 2 frames, in the case where focal length is long, or in the case of a lens having a large wide open aperture (small F No.). Accordingly, the body control section 204 changes the minimum frame number in accordance with the focal length or wide open F No. of the photographing optical system (refer to S37). It is therefore possible to set an appropriate minimum frame number in accordance with the photographing environment of the camera.

Next, detailed operation of the focus position calculation in step S19 (refer to FIG. 3) will be described using the flowchart shown in FIG. 5.

If the flow for focus position calculation is entered, final focusing position usable determination is first carried out (S61). As has been described above, with contrast AF a contrast value is calculated every time image data for one frame is output from the image sensor 201. For example, in the case of 60 frames per second, a contrast value is calculated every ¹⁄₆₀th of a second. This means that depending on the start time of continuous shooting when the second release switch is turned on, there may be cases where the reliability of the focus position prediction calculation is low, such as when quite a long time has elapsed from the time of calculation of focus position (refer to step S51 in FIG. 4), or when the subject moves suddenly after focus position calculation. In this step therefore, it is determined whether or not the final focus position information is reliable using final focus position information (focus position and focus time, referring to the focus history of step S51 of FIG. 4) and current information (current position and current time). Detailed operation of this final focusing position usable determination will be described later using FIG. 6.

If final focusing position usable determination has been carried out in step S61, it is next determined whether or not the final focus position is usable (S63). Here, determination is in accordance with determination result for step S61.

If the result of determination in step S63 is that the final focus position is usable, moving body prediction time calculation is carried out (S65). Here, in predicting the focus position using the focus history, a time until exposure is calculated. In the case where the release button has been pressed down fully, this is the time from when the second release which is turned on until exposure, or in the case where continuous shooting is in progress the time until the next exposure. As a time until exposure, it is made a halfway point during exposure (a point in time where half of the time from commencement of exposure until completion of exposure has elapsed).

If the moving body prediction time has been calculated, predicted pulse position calculation is next carried out, and pos is set to this calculated value (S67). Here, using the focus history, predictive calculation for the position of the subject is carried out after the moving body prediction time that was calculated in step S65, and setting of drive pulse position LDP in order to position the focusing lens of the photographing lens 101 at the focus position of this predictive calculation result is carried out.

With this embodiment, predictive calculation is carried out by straight-line approximation with a least square method, using focus position pos[ ] and focus time[ ] that are stored in the focus history such as shown in FIG. 8A. Naturally there is no problem with adopting a predictive calculation method that is different to this. Also, when carrying out predictive calculation, the time of the next exposure is calculated. The time of next exposure is calculated using the following equation (2).

$$\text{time of next exposure} = \text{current time} + \text{time required for focus drive} + \text{exposure time}/2 \qquad (2)$$

The time required for focus drive will be described in detail when describing the processing flow for focus drive execution shown in FIG. 7.

Accordingly, a focus position for the time of the next exposure that has been obtained from equation (2) is predictively calculated by straight-line approximation based on the focus history shown in FIG. 8A. With this embodiment, the focus position that has been predictively calculated is represented by LDP showing the drive position of the focusing lens. Specifically, the focus position is represented by a number of pulses of a photo interrupter etc. from a reference position.

If the result of determination in step S63 is that it is not possible to use the final focus position, then the focus position is set to the current LDP (focus position pos=current LDP) (S69). Here, since it was determined in step S61 that it was not possible to use the final focus position, the focus position that was decided by the final scan is made the drive position (LDP) for the focusing lens of the photographing lens 101. Focus drive for the case where focus position prediction is not possible will be described later using FIG. 10.

If focus position pos is made current LDP in step S69, or if a value from the predicted pulse position calculation in step S67 has been set for pos, the originating processing flow is returned to.

Figure 5:
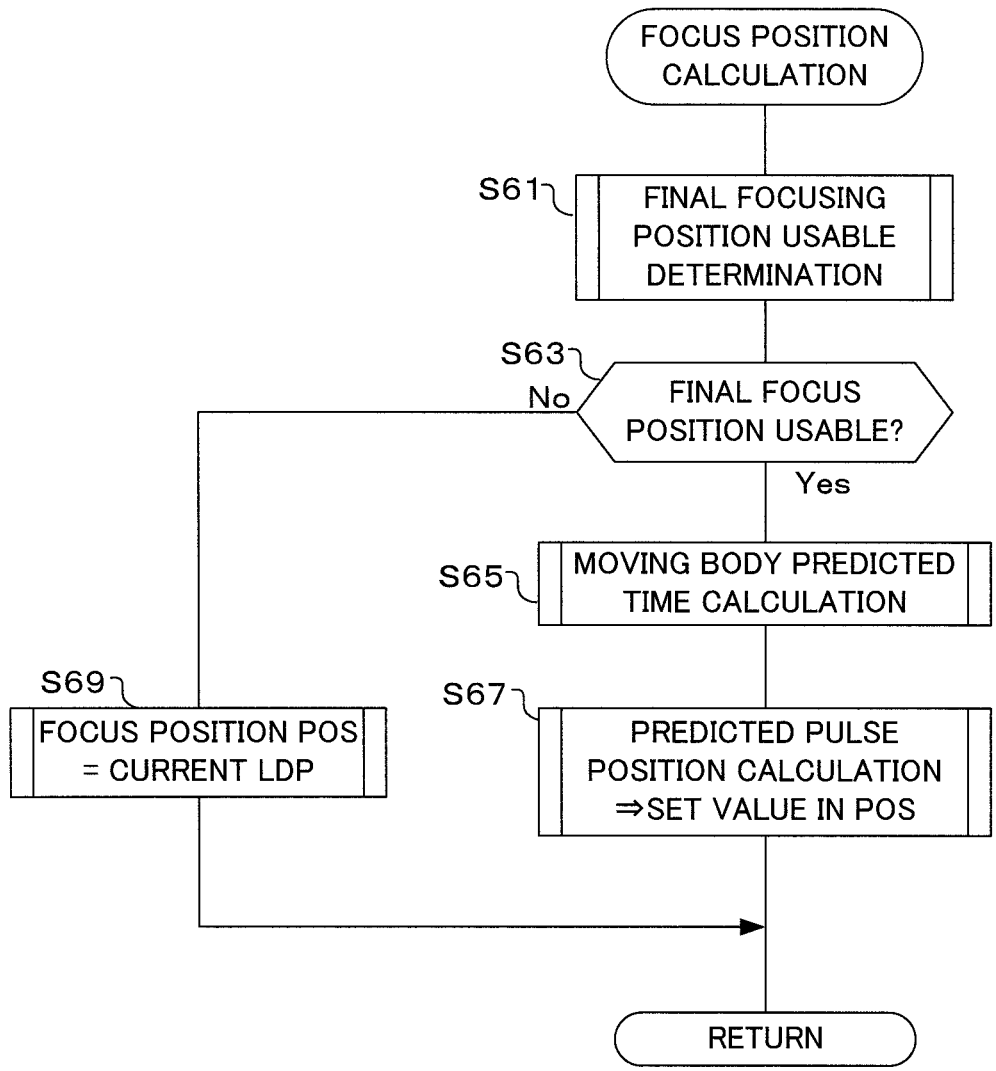
FIG. 5 is a flowchart showing a focus position calculation operation of the camera of the one embodiment of the present invention.

In this way, in the case of predicting the focus position for a specified time (S63 Yes in FIG. 5) based on a plurality of stored previous focus position information items (refer to S51 of FIG. 4) in accordance with detection result of the scan operation that was finally executed (refer to S17 of FIG. 3), focus position for the time of exposure using the image sensor is predicted based on the stored plurality of previous position information items (S67 in FIG. 5). Movement of the focusing lens is carried out using the result of this predictive calculation (refer to S21 of FIG. 3).

Also, in the case where the result of determining usability of the final focus position in accordance with detection result of the scan operation that was finally executed (refer to S17 of FIG. 3) is not usable (S63 No in FIG. 5), a position of the focusing lens at the time of actual shooting is made the position of the focusing lens at the time of terminating the finally executed scan operation (S69 in FIG. 5).

Figure 6:
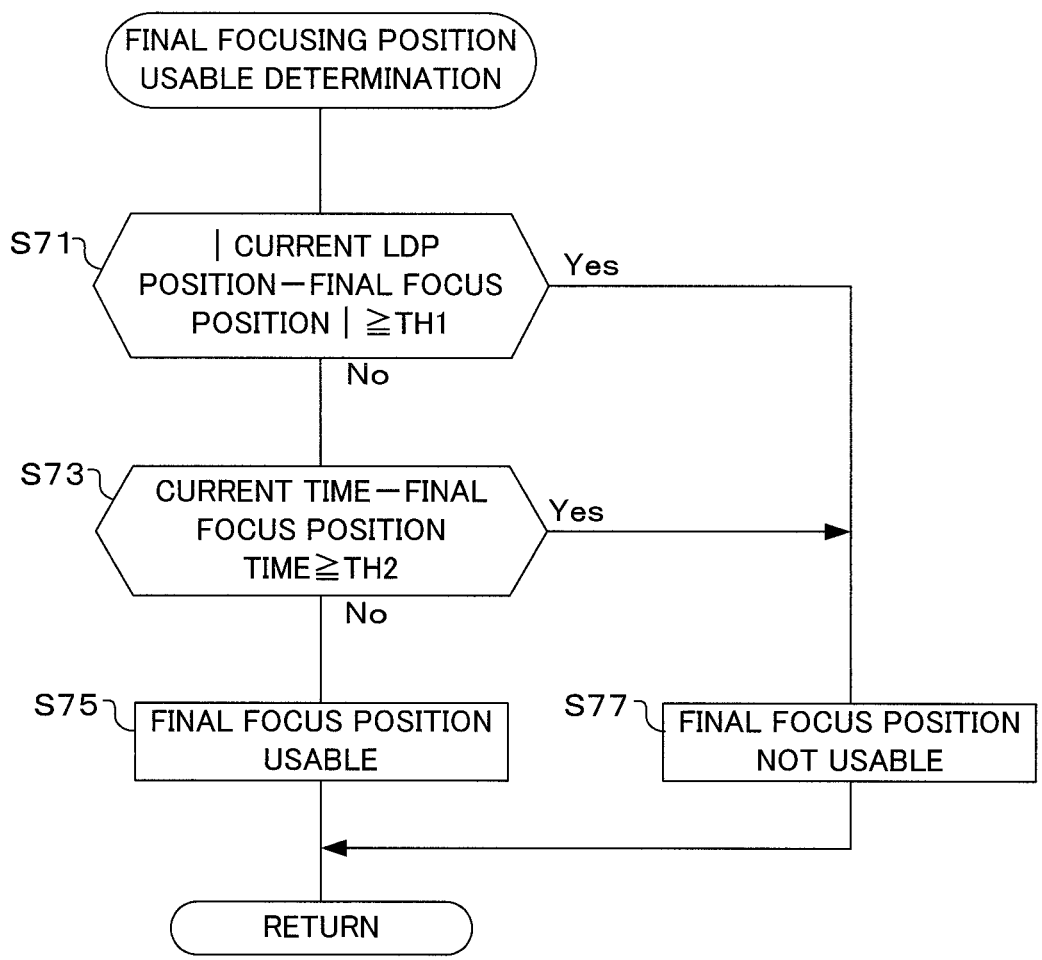
FIG. 6 is a flowchart showing a final focusing position usable determination operation of the camera of the one embodiment of the present invention.

Next, detailed operation of the final focusing position usable determination of step S61 (refer to FIG. 5) will be described using the flowchart shown in FIG. 6. If the processing flow for final focusing position usable determination is entered, it is first determined whether or not |current LDP−final focus position|≥TH1 (S71). Here, it is determined whether or not an absolute value, of a value obtained by subtracting the latest focus position information (final focus position), among the plurality of previous focus position information items that were stored in step S51 (refer to FIG. 4), from a position of the focusing lens that was detected by the finally executed scan operation (current LDP), is greater than a first specified value (TH1). This |current LDP−final focus position| corresponds to a distance LA in FIG. 10 which will be described later.

If the result of determination in step S71 was No, it is next determined whether or not current time−final focus time≥TH2 (S73). Here it is determined whether or not a value, that has been obtained by subtracting the time at which the latest position information was detected, among the plurality of previous focus position information items that were stored in step S51, from the time at which the focusing lens position was detected by the finally executed scan operation, is greater than or equal to a second specified value (T H2). This "current time−final focus time" corresponds to time TA in FIG. 10 which will be described later.

If the result of determination in step S73 was No, it is determined that the final focus position is usable (S75). On the other hand, if the result of determination in step S71 was Yes, or if the result of determination in step S73 was Yes, it is determined that the final focus position is not usable (S77). If the determinations of steps S75 or S77 have been carried out, the originating processing flow is returned to.

In this way, with the processing flow for final focusing position usable determination, if a difference between the latest position information, among the stored plurality of previous items of position information, and the position of the focusing lens that was detected by the finally executed scan operation is greater than or equal to the first specified value (Yes in S71), it is determined that focus position for a specified time will not be predicted based on previous position information (S77). Also, if a difference between a time when the latest position information was detected, among a plurality of previous items of position information that have been stored in the storage section 203, and a time when a focusing lens position that achieves focus using the finally executed scan operation was detected is greater than or equal to a second specified value (Yes in S73), it is determined that a focus position for a specified time will not be predicted based on the previous position information (S77).

Next, detailed operation of the focus drive operation in step S21 (refer to FIG. 3) will be described using the flowchart shown in FIG. 7. If the processing flow for focus drive operation is entered, focus position is first transmitted to the lens (S81). Here, the body control section 204 transmits information on focus position (represented by focusing lens position LDP) that has been predicted by focus position calculation (refer to S19 of FIG. 3 and S67 of FIG. 5) to the lens control section 103. The lens control section 103 drives the focusing lens to the focus position using the motor drive section 102, based on focus position information.

Then, the processing waits for focus position to be reached (S83). In step S81, the focusing lens is driven, position of the focusing lens at this time is detected, and if the focus position is reached the lens control section 103 outputs a focus reached signal to the camera control section 204.

If it has been determined that the focus position has been reached in step S83, the processing waits for a time required for focus drive (S85). If exposure is carried out immediately after focus drive has been completed quicker than expected, the continuous shooting speed will become unstable, and it will not be possible to ensure prediction accuracy. Therefore, in the case where focus drive has been completed too soon, control is carried out to delay the time of executing exposure.

Determination to wait for the time required for focus drive is carried out as follows. Specifically, determination is in accordance with equation (3) below.

current time≥time of commencing focus position drive execution command+time required for focus drive (3)

The time required for focus drive is data such as is shown in FIG. 8B stored in the storage section 203 within the camera body 200, and may be used by reading out in accordance with lens information from the interchangeable lens 100. In FIG. 8B, the synchronization frequency is a frame frequency of the image sensor 201, and indicates a synchronization frequency that can be handled by an interchangeable lens 100 that has been fitted. The higher the synchronization frequency that can be handled by the interchangeable lens 100 the faster it is possible to carry out lens drive. This is because it is desirable to limit lens drive amount corresponding to a period for taking a single frame to less than or equal to a specified amount, making it possible to handle a higher synchronization frequency as the lens drive speed increases. Accordingly, with this embodiment the body control section 204 functioning as the limit time setting section sets movement time (time for moving the focusing lens to the focus position) based on the synchronization frequency that the interchangeable lens 100 can handle.

Also, as to whether or not there is hysteresis cancel, a case where it is necessary to take into consideration the effect of backlash of the interchangeable lens is "hysteresis cancel", while a case where it is not necessary to take the effects of backlash into consideration is "no hysteresis cancel", and is available as lens information from the interchangeable lens 100. Once synchronization frequency and whether or not there is hysteresis cancel are known, the time required for focus drive is decided. With this embodiment the body control section 204 functioning as the limit time setting section sets movement time (time for moving the focusing lens to the focus position) based on backlash of the lens drive section.

Besides storing data for the time required for focus drive in the storage section 203 of the camera body 200, it may also be held at the interchangeable lens 100 side. Data of the time required for focus drive is a value that is dependent on the interchangeable lens 100 side, and so holding it at the interchangeable lens 100 side results in an optimum value.

For example, a lens drive time for the case of performing lens drive by 0.5 mm at the imaging surface may be stored in the interchangeable lens 100. Also, in order to improve accuracy, acceleration time and deceleration time for the case of actual lens drive may be held. In the case of a drive amount at the time of focus drive of 0.1 mm, it is possible to calculate using the equation (4) below.

time required for focus drive=(0.5 mm drive time−acceleration time−deceleration time)×0.1/0.5+acceleration time+deceleration time (4)

By setting the predicted time for exposure and controlling start time of exposure based on this time, it is possible to stabilize the continuous shooting speed, and it is possible to carry out moving body predictive AF control with good accuracy.

If waiting for time required for focus drive has been executed in step S85 the flow for focus drive execution is terminated and the originating processing flow is returned to.

In this way, in the processing flow for focus drive execution, time taken, such as for focus drive, is switched in accordance with the type of interchangeable lens that is fitted. Time is different depending on the synchronization frequency that can be handled by the lens and whether or not there is drive with hysteresis acquisition at the lens side. Also, time taken for focus drive etc., as a modified example, may be stored at the lens side as drive amount for the case of driving by a fixed drive amount, and acquired by means of communication. When calculating predicted focus position at the time of exposure, exposure execution time is calculated using time taken for focus drive etc., and focus position is predicted from focus history.

Figure 9:
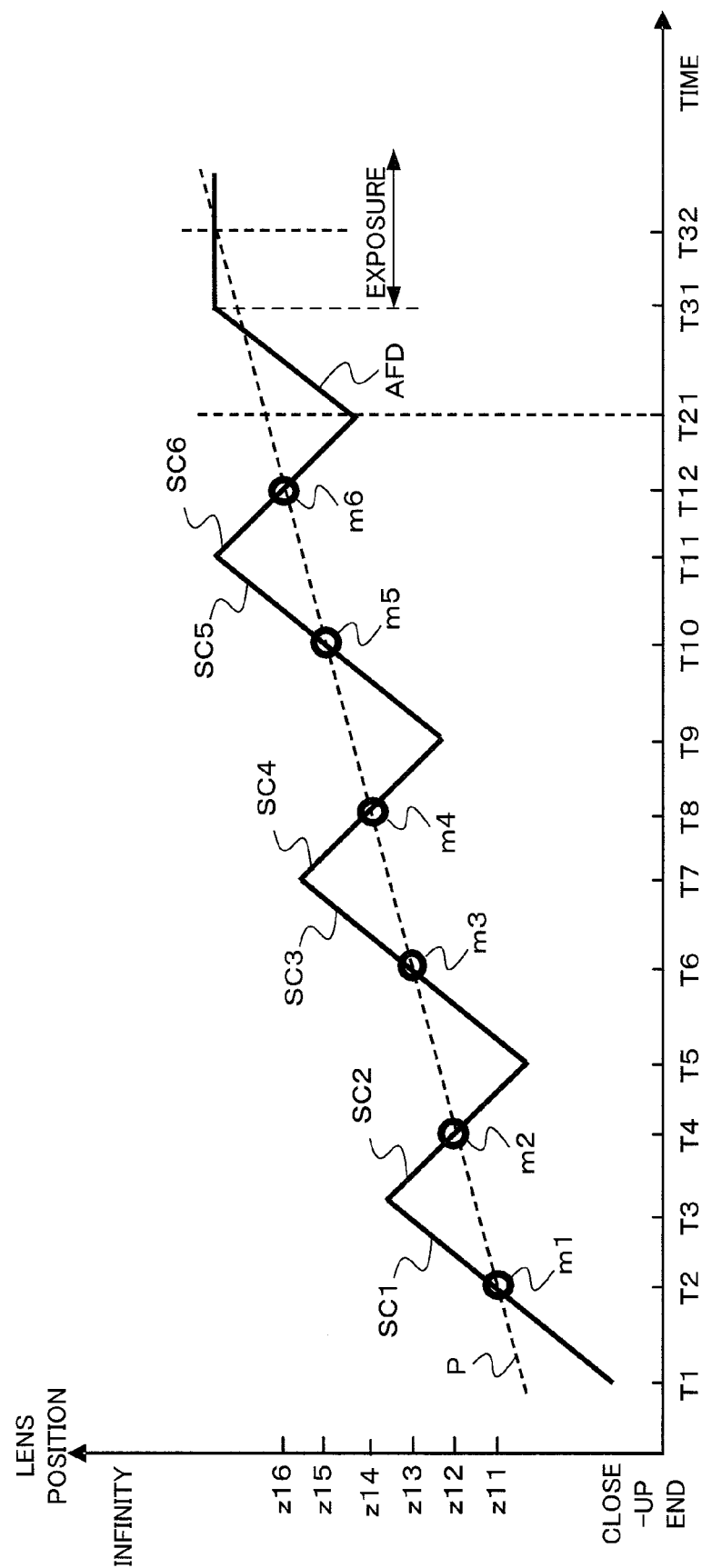
FIG. 9 is a graph showing one example of lens position control for a case where prediction is possible, in the camera of one embodiment of the present invention.
Figure 10:
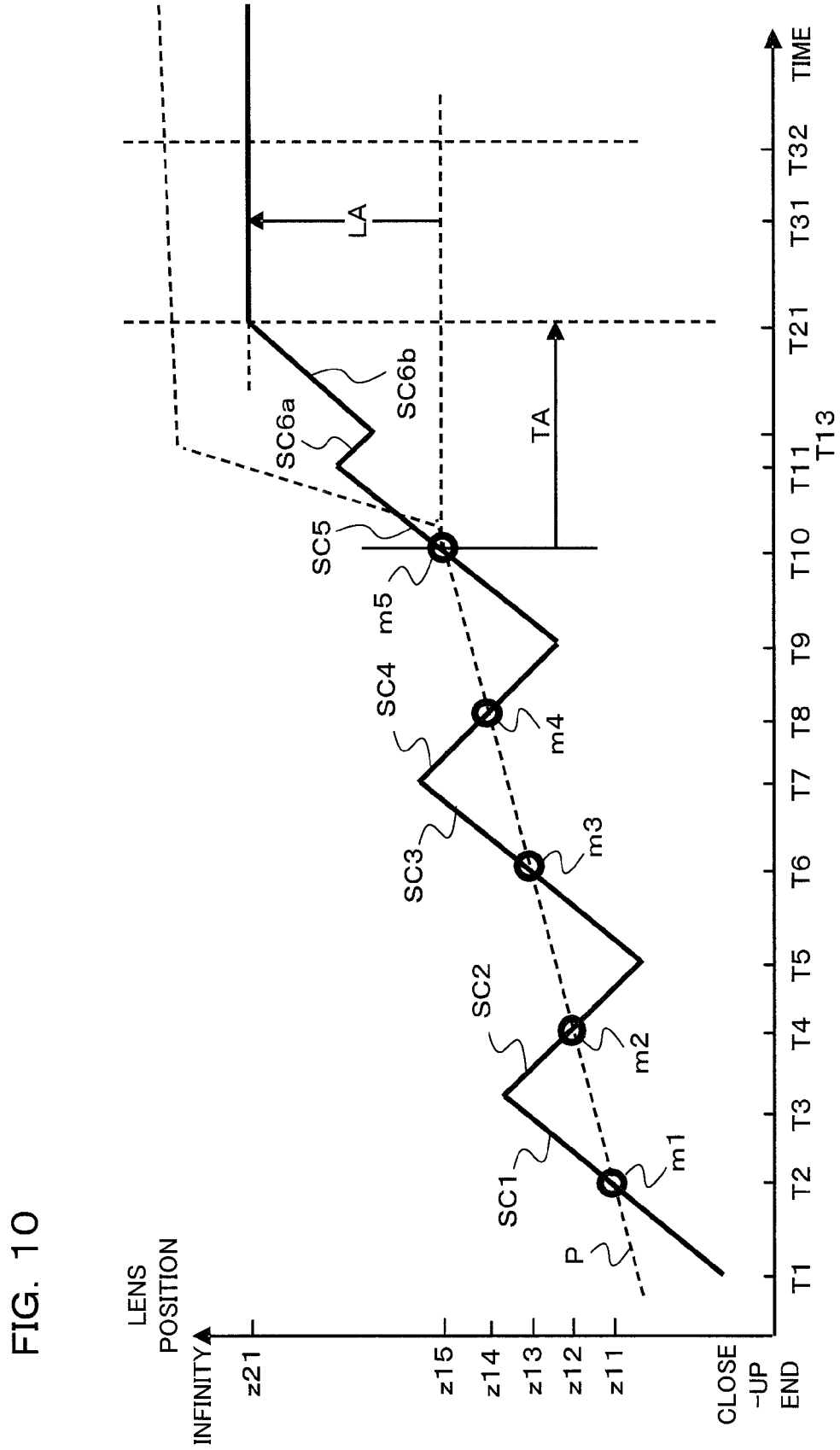
FIG. 10 is a graph showing one example of lens position control for a case where prediction is not possible, in the camera of one embodiment of the present invention.

Next, an example of predicting focus position at the time of continuous AF will be described using FIG. 9 and FIG. 10. FIG. 9 shows lens position control for the case where prediction execution is possible, and FIG. 10 shows lens position control for the case where prediction execution is not possible. In FIG. 9 and FIG. 10, the horizontal axis represents change in time and the vertical axis represents lens position.

In FIG. 9, from time T1-time T3 a first scan SC1 is carried out, and at this time contrast value (AF evaluation value) is repeatedly calculated every time image data from the image sensor 201 is output (refer to steps S33-S51 in FIG. 4). If a peak of contrast value at this time is detected, focus position is calculated. With the example shown in FIG. 9, focus position z11 is calculated at time T2.

Once the first scan SC1 has been completed, the drive direction of the focusing lens is reversed (refer to step S57 in FIG. 4), a second scan SC2 is executed from time T3 to time T5, and focus position z12 is calculated at time T4. Thereafter, similarly, a third scan SC3 is executed from time T5-T7 and focus position z13 is calculated at time T6, a fourth scan SC4 is executed from time T7-T9 and focus position z14 is calculated at time T8, a fifth scan SC5 is executed from time T9-T11 and focus position z15 is calculated at time T10, and a sixth scan SC6 is executed from time T11-T21 and focus position z16 is calculated at time T12.

A line linking lens positions of focus positions m1-m6 is a subject movement line P representing change in subject position. Focus position m6 represents the latest focus position, focus position m5 represents a focus position one previous, and focus position m4 represents a focus position two previous, with lens positions (z11-Z16) corresponding to these focus positions, and the times (T2, T4, T6, T10, T12) of those lens positions being stored in sets as focus position history in the storage section 203.

At the time T21, if the second release is pressed down to terminate the scan, or if at the time of continuous shooting it is time for the next exposure, the final focusing position usable determination of step S63 within the focus position calculation shown in FIG. 5 is performed, and with the example shown in FIG. 9 it is determined that the final focus position (with this example the focus position m6) is usable.

If it has been determined that the final focus position is usable then exposure commences at time T31, a moving body prediction time from time T21 to time T32 is calculated (referred to S65 in FIG. 5), predictive calculation of a focus position at the time of exposure, namely a position of a subject at a time T32 where ½ the exposure time has elapsed, is carried out based on this moving body prediction time and a subject movement line P (refer to S67 in FIG. 5), and drive of the focusing lens along the drive line AFD is carried out (refer to S21 in FIG. 3).

As was described previously, FIG. 10 shows an example of control of lens position in the case where predictive operation is not possible. From time T1-T11, similarly to the case for FIG. 9, scans SC1-SC5 are carried out. After the time of starting the sixth scan SC6a, the scan direction is reversed at time T13. This is because although the focusing lens starts to be driven with the direction reversed in step S57 (refer to FIG. 4), the determination of step S39 is that contrast value has decreased, and so there may be cases where scan direction has been reversed again (refer to S41 of FIG. 4).

Scan direction is reversed, at time T21 during execution of the scan SC6b the second release is pressed down, or it is time for the next exposure in continuous shooting. In this case also, the final focusing position usable determination of step S63 during the focus position calculation shown in FIG. 5 is performed. With the example shown in FIG. 10, it is determined that the final focus position (with this example focus position m5) is not usable. Specifically, the determination of step S71 is that |current LDP−final focus position|≥TH1. With the example shown in FIG. 10, a difference LA between the final focus position m5 and current LDP (z21) is larger than the specified value TH1. If the determination of step S73 has been carried out, a difference time TA between the time T10 of the final focus position m5 and the current time T21 is greater than the specified value TH2.

In this way, with the example shown in FIG. 10, it is determined that the final focus position (m5) is not usable. As a result, focus drive is carried out at a lens position z21 corresponding to a current position that corresponds to current time T21 (S69 in FIG. 5).

Figure 12:
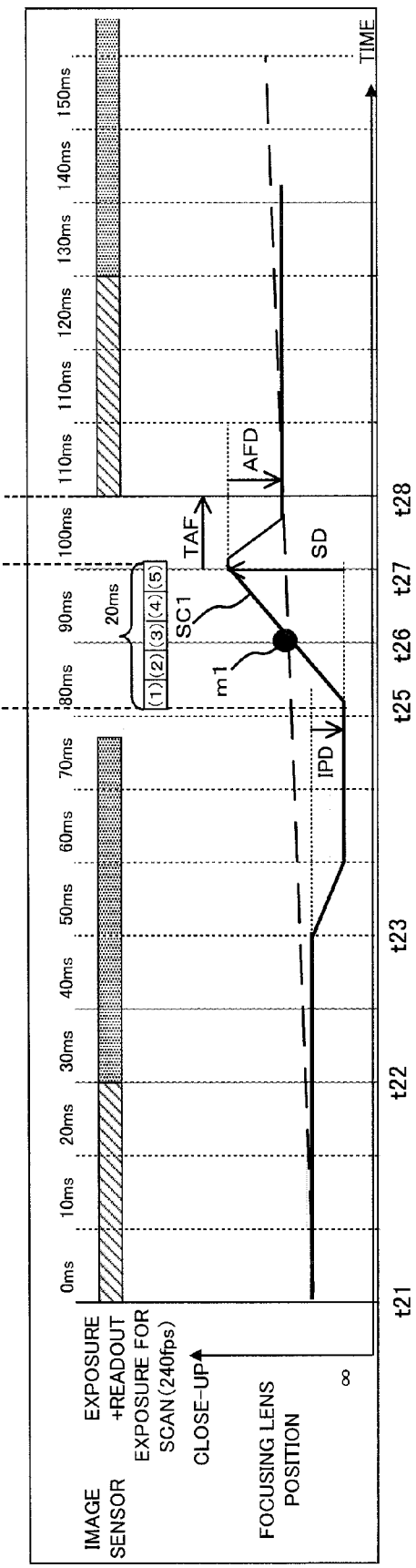
FIG. 12 is a timing chart showing camera operation for the case of an exposure time longer than $1/50^{th}$ of a second, for the camera of the one embodiment of the present invention.

Next, operation of this embodiment at the time of continuous shooting C-AF will be described using the timing charts shown in FIG. 11A, FIG. 11B and FIG. 12. Here, a continuous shooting speed that has been set is made 10 frames per second. FIG. 11A is for a case of an exposure time of $\frac{1}{50}^{th}$ of a second, and in this case if the shutter speed is less than or equal to $\frac{1}{50}^{th}$ of a second it is appropriate for being able to guarantee continuous shooting speed. FIG. 11B is of a case where exposure time is shorter that $\frac{1}{50}^{th}$ of a second, and in this case the time in which scan operation for contrast AF is possible with continuous shooting speed maintained is increased by the extent to which exposure time has become shorter. As a result, focus history data is increased, and it is possible to improve focus precision and prediction accuracy. FIG. 12 is for a case where exposure time is longer than $\frac{1}{50}^{th}$ of a second, and in this case continuous shooting speed is slowed down by the extent to which the exposure time is prolonged, but it is possible to ensure a minimum number of frames for contrast AF, and it is possible to maintain AF performance.

In FIG. 11A, the horizontal axis represents the flow of time. Exposure is commenced at a time t1. Exposure is completed at the time t2 when 20 ms ($\frac{1}{50}^{th}$ of a second) has elapsed from commencement of exposure, and readout of imaged data from the image sensor 201 is commenced. Initial position drive is commenced from time t3 during readout of imaged data (refer to S13 of FIG. 3), and the position of the focusing lens is moved by an initial position drive amount IPD.

In FIG. 11A, if time t5 is reached scan is commenced, and contrast values are acquired while moving the focusing lens up until the scan cut-off time t7. As described previously, scan cut-off time is obtained using:

scan cut-off time=predicted time of commencement of next exposure−time required for focus drive (1)

With the example shown in FIG. 11A, the time of commencement of the next exposure is t8, and this time is decided in accordance with the continuous shooting speed. Also, the time required for focus drive may also be stored in the storage section 203 within the camera body 200, as shown in FIG. 8B, or may be acquired from the interchangeable lens 100 as a lens information.

From the scan commencement time t5 until the scan cut-off time t7 contrast values are acquired while carrying out scan SC1 to move the focusing lens by the scan drive amount SD. With this embodiment, since the frame rate is 240 fps (frames per second), a contrast value is output about every 4 ms, and with the example of FIG. 11A a total of 5 contrast values (1) to (5) are acquired. Focus position m1 and focus time t6 are calculated based on these contrast values, and stored as a focus history. The minimum number of frames here is made 5.

If the scan cut-off time t7 has passed, focus drive is carried out from the focus position at the point in time when scan was completed to the predicted focus position (refer to focus drive AFD in the drawings) up until the predicted exposure start time t8 (refer to time taken for focus drive etc. TAF in the drawings). As was described for S85 of FIG. 7, the lapse of the time required for focus drive is awaited even if the focus prediction position has been reached. If the commencement time for the next exposure t8 is reached, exposure is commenced.

Next, as was described previously, FIG. 11B shows a case where the exposure time is shorter than $\frac{1}{50}^{th}$ of a second. If exposure is commenced at a time t11, exposure will be completed at the time t12 (<time t2), and read out of imaged data is commenced. In order to shorten the exposure time for the exposure, initial position drive is commenced at a time t13 (<time t3), and the scan is commenced at a time t15 (<t5). The scan cut-off time t17 is the same as the scan cut-off time t7 for the case in FIG. 11A, and so it is possible to execute scan SC2 in addition to scan SC1. At this time, a total of 10 contrast values are acquired from (1) to (10). As a result, it is possible to improve focus precision and prediction accuracy.

If the scan cut-off time t17 has passed, focus drive is carried out from the focus position at the point in time when scan was completed to the predicted focus position, up until the exposure start time t18. With this example also, the lapse of the time required for focus drive is awaited even if the focus prediction position has been reached. If the commencement time for the next exposure t18 is reached, exposure is commenced.

Next, as was described previously, FIG. 12 shows a case where the exposure time is longer than $\frac{1}{50}^{th}$ of a second. If exposure is commenced at a time t21, exposure will be completed at the time t22 (>time t2), and read out of imaged data is commenced. Since the exposure time of the exposure is long, initial position drive is commenced as soon as time t23 (>time t3) is reached, and scan commence after time t25 (>time t5) is reached. The scan cut-off time is the same as the scan cut-off time t7 for the case of FIG. 11A, and is t26. At time t26, scan is in progress and the cut-off time is reached without being able to detect a peak (S45 Yes), and since the minimum number of frames is not reached (S47 No) the scan operation is continued. Then, if the minimum umber of frames is reached at time t27 (S47 Yes), the scan operation is terminated (refer to S45, S47 in FIG. 4). During this, contrast values (1)-(5) are acquired for the minimum number of frames, and the focusing lens is moved to the predicted focus position until the exposure start time t28. If the commencement time for the next exposure t28 is reached, exposure is commenced. In this way, the minimum number of frames for contrast AF is ensured, and it is possible to maintain AF performance. Also, compared to the set continuous shooting speed of 10 frames per second (continuous shooting interval of 100 ms), it is possible to minimize the actual continuous shooting speed to 9.1 frames (continuous shooting interval of 110 ms).

As has been described above, with the one embodiment of the present invention a limit time in which carrying out the scan operation is effective is set in accordance with continuous shooting speed by the continuous shooting speed setting section, and the scan operation is controlled so that this set limit time is not exceeded. As a result it becomes possible to carry out contrast detection an optimum number of times in accordance with set continuous shooting speed.

Also, with the one embodiment of the present invention, a minimum value for a number of frames of imaged data required in order to detect a peak of contrast using the scan operation is stored, and scan operation is carried out in accordance with a number of frames being the minimum value or more. As a result, in predicting the focus position with contrast AF, since peak detection is carried out for a minimum number of frames, it becomes possible to ensure focus precision and prediction accuracy.

With this embodiment, there are 3 determinations, namely has the cut-off time been reached, has a minimum number of frames been reached, and has direction been decided (S35-S37 of FIG. 4), but it is also possible to omit any of these conditions and also to add other conditions. Also, there are three determinations, namely has the cut-off time been reached, has a minimum number of frames been reached, and has a peak been detected (S45-S49 of FIG. 4), but it is also possible to omit any of these conditions and also to add other conditions.

Further, with this embodiment, a device for taking pictures has been described using a digital camera, but as a camera it is also possible to use a digital single lens reflex camera or a compact digital camera, or a camera for movie use such as a video camera, and further to have a camera that is incorporated into a mobile phone, a mobile information terminal (PDA: Personal Digital Assistant), game console etc. In any event, it is possible to adopt the present invention as long as a device for taking pictures carries out automatic focus adjustment using contrast AF.

Also, regarding the operation flow in the patent claims, the specification and the drawings, for the sake of convenience description has been given using words representing sequence, such as "first" and "next", but at places where it is not particularly described, this does not mean that implementation must be in this order.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. A focus adjustment unit, for carrying out focus adjustment of a photographing optical system that concentrates light from a subject, including a focusing lens capable of movement in the optical axis direction, comprising:
   a lens drive section for driving the focusing lens;
   an image sensor for acquiring imaged data for a subject image that has been concentrated by the photographing optical system;
   a control section for executing imaging operations using the image sensor by causing movement of the focusing lens, and carrying out a scan operation for detecting position of the focusing lens at which a peak of image contrast occurs, based on a plurality of items of imaged data output by the image sensor,
   a continuous shooting speed setting section for setting a speed for continuously executing exposure operations for shooting using the image sensor; and
   a limit time setting section for setting an effective limit time for carrying out the scan operation in accordance with a continuous shooting speed that has been set by the continuous shooting speed setting section,
   wherein the control section controls the scan operation so that the time that has been set up by the limit time setting section is not exceeded,
   wherein the limit time setting section sets the limit time to a time that is before the time when exposure for shooting of the image sensor commences, by a movement time for achieving focus by moving the focusing lens to a focusing lens position where contrast detected by the scan operation becomes a peak, and
   wherein the limit time setting section sets the movement time based on a frame frequency of the image sensor can be handled by the lens drive section.

2. The focus adjustment unit of claim 1, wherein the limit time setting section sets the movement time based on backlash of the lens drive section.

3. The focus adjustment unit of claim 1, wherein the control section permits execution of a scan operation after a time that has been set by the limit time setting section has elapsed in the case where it is possible to set release priority mode and release priority mode has not been set.

4. The focus adjustment unit of claim 1, wherein the control section stores a minimum value for a number of frames of imaged data required in order to detect a peak of contrast using the scan operation, and carries out scan operation in accordance with a number of frames being the minimum value or more.

5. The focus adjustment unit of claim 4, wherein the control section determines that detection is impossible in the case where detection of a peak of contrast was not possible when the number of frames the scan operation was carried out for has reached the minimum value.

6. The focus adjustment unit of claim 4, wherein the control section continues the scan operation until the number of frames reaches the minimum value, in the case where it was not possible to detect a peak of contrast at the time that the limit time was reached during the scan operation.

7. The focus adjustment unit of claim 4, wherein the control section changes the minimum value in accordance with focal length or wide-open F No. of the photographing optical system.

8. A camera system, comprising a camera body having an image sensor, and an interchangeable lens removably attached to the camera body, wherein:
   the interchangeable lens comprises:
      a photographing optical system, including a focusing lens capable of moving in the optical axis direction and capable of adjusting a focused state, for introducing subject light to the image sensor;
      a lens communication section for carrying out communication with the camera body; and
      a lens control section for controlling communication operations with the camera body by the lens communication section, and controlling movement of the focusing lens, and
   the camera body comprises:
      a body communication section for carrying out communication with the interchangeable lens;
      a body control section for instructing movement of the focusing lens to the lens control section, and carrying out focus adjustment by executing imaging operations using the image sensor and controlling a scan operation for detecting position of the focusing lens at which a peak of image contrast occurs, based on a plurality of items of imaged data output by the image sensor;

a continuous shooting speed setting section for setting a speed for continuously executing exposure operations for shooting using the image sensor; and a limit time setting section for setting an effective limit time for carrying out the scan operation in accordance with a continuous shooting speed that has been set by the continuous shooting speed setting section, wherein the body control section control the scan operation so that the limit time that has been set up by the limit time setting section is not exceeded, wherein the interchangeable lens has a lens data storage section for storing lens data, that is information relating to the interchangeable lens, read out from the lens control section, wherein the limit time setting section sets the effective limit time for carrying out the scan operation in accordance with lens data that has been stored in the lens data storage section acquired by means of the body communication section, and wherein the limit time setting section sets the movement time based on lens data relating to frame frequency of the image sensor that can be handled by a lens drive section for driving the focusing lens.

9. The camera system of claim 8, wherein:
the limit time setting section sets the limit time to a time that is before the time when exposure for shooting of the image sensor commences, by a movement time for achieving focus by causing focusing lens movement to a focusing lens position where contrast detected by the scan operation becomes a peak.

10. The camera system of claim 8, wherein:
the limit time setting section sets the movement time based on lens data relating to backlash of the focusing lens.

11. The camera system of claim 8, wherein:
the body control section permit execution of a scan operation after a time that has been set by the limit time setting section has elapsed in the case where it is possible to set release priority mode and release priority mode has not been set.

12. The camera system of claim 8, wherein:
the body control section store a minimum value for a number of frames of imaged data required in order to detect a peak of contrast using the scan operation, and carries out scan operation in accordance with a number of frames being the minimum value or more.

13. The camera system of claim 12, wherein:
the body control section determine that detection is not possible in the case where the number of frames has reached the minimum value during the scan operation, and when it was not possible to detect a peak of contrast.

14. The camera system of claim 12, wherein:
the body control section continue the scan operation until the number of frames reaches the minimum value, in the case where it was not possible to detect a peak of contrast at the time that the limit time was reached during the scan operation.

15. The camera system of claim 12, wherein:
the interchangeable lens has a lens data storage section for storing lens data, that is information relating to the interchangeable lens, read out from the lens control section, and the body control section change the minimum value that have been stored in the lens data storage section and have been acquired by means of the body communication section in accordance with focal length or wide-open F. No. of the photographing optical system.

* * * * *